United States Patent
Ho

(10) Patent No.: US 10,188,077 B2
(45) Date of Patent: Jan. 29, 2019

(54) HANG-ON NATURAL WATER DRINKING SYSTEM

(71) Applicant: Ying Yeeh Enterprise Co., Ltd., Tainan (TW)

(72) Inventor: Wang-Jyun Ho, Tainan (TW)

(73) Assignee: Ying Yeeh Enterprise Co., Ltd., Tainan (TW)

( * ) Notice: Subject to any disclaimer, the term of this patent is extended or adjusted under 35 U.S.C. 154(b) by 267 days.

(21) Appl. No.: 15/397,781

(22) Filed: Jan. 4, 2017

(65) Prior Publication Data

US 2018/0184615 A1    Jul. 5, 2018

(51) Int. Cl.
*A01K 7/02* (2006.01)
*A01K 1/035* (2006.01)

(52) U.S. Cl.
CPC .............. *A01K 1/0356* (2013.01); *A01K 7/02* (2013.01)

(58) Field of Classification Search
CPC . A01K 7/00; A01K 7/02; A01K 7/005; A01K 45/002
USPC ...................................... 119/74, 72
See application file for complete search history.

(56) References Cited

U.S. PATENT DOCUMENTS

| | | | | |
|---|---|---|---|---|
| 5,799,609 A | * | 9/1998 | Burns | A01K 7/00 119/74 |
| 6,460,483 B1 | * | 10/2002 | Northrop | A01K 7/00 119/702 |
| 8,381,685 B2 | * | 2/2013 | Lipscomb | A01K 45/002 119/74 |
| 9,402,375 B2 | * | 8/2016 | Lipscomb | A01K 7/00 |
| 9,474,249 B2 | * | 10/2016 | Lipscomb | A01K 7/02 |

* cited by examiner

*Primary Examiner* — Yvonne R Abbott-Lewis
(74) *Attorney, Agent, or Firm* — Alan D. Kamrath; Kamrath IP Lawfirm, P.A.

(57) ABSTRACT

A hang-on natural water drinking system adapted to effectuate a natural water state includes: a holder having a pipe segment; a water-holding unit for holding drinking water and provided with a connecting segment for drawing water off the water-holding unit, allowing the pipe segment to fit around the connecting segment; and a drinking unit serving pets and comprising a basic drinking portion, a supporting portion, and a diverting portion, the basic drinking portion having an end extending to form a guide trough for abutting against the connecting segment to guide water to the basic drinking portion. Water is driven by a submerged motor coupled to the basic drinking portion to the diverting portion coupled to the basic drinking portion to circulate through the drinking unit continuously and flow across blocking regions defined at the diverting portion to therefore enter a turbulent white-water drinking state.

9 Claims, 4 Drawing Sheets

HANG-ON NATURAL WATER DRINKING SYSTEM

BACKGROUND OF THE INVENTION

1. Field of the Invention

The present invention relates to a hang-on natural water drinking system characterized in that a water-holding unit for holding drinking water and provided with a drinking unit which serves pets, including a basic drinking portion which extends to form a guide trough to guide water to the basic drinking portion coupled to a diverting portion for draining the incoming water outward, allowing the water to circulate through the drinking unit continuously and flow across blocking regions defined at the diverting portion to therefore enter a turbulent white-water drinking state.

2. Description of the Prior Art

A conventional container apparatus for use as a basic drinking portion in serving pets is not only easily hung on a cage or a predetermined support, but is also directly placed on the floor to appropriately control the flow rate. The container apparatus, provided in either of the two aforesaid forms, functions as the basic drinking portion to serve the pets. The present invention aims to improve on the conventional drinking apparatus directly hung on a predetermined support. The drinking apparatus of the present invention enables the pets to lick water from a draining mouth of the drinking apparatus directly, because the drinking apparatus of the present invention is capable of supplying water and timely stopping the water supply.

Although conventional hang-on drinking apparatuses allow pets to drink water at any time and conveniently, they fail to supply natural water to the pets. The inventor of the present invention aims to improve on the conventional hang-on drinking apparatuses by providing a hang-on natural water drinking system which not only supplies natural water but also enables the water to circulate in the drinking apparatus continuously.

SUMMARY OF THE INVENTION

The first objective of the present invention is to provide a hang-on natural water drinking system, provided in form of a hang-on drinking system adapted to effectuate a natural water state, the hang-on drinking system comprising: a holder having a pipe segment; a water-holding unit for holding drinking water and laterally provided with a connecting segment for drawing water off the water-holding unit, allowing the pipe segment to fit around the connecting segment; and a drinking unit serving pets and comprising a basic drinking portion, a supporting portion, and a diverting portion, the basic drinking portion having an end extending to form a guide trough, the guide trough abutting against the connecting segment from below to guide water to the basic drinking portion, allowing water to go from an end of a submerged motor to the diverting portion coupled to the basic drinking portion, allowing the water in the diverting portion to flow across at least one blocking region defined at the diverting portion in a manner to enter a turbulent white-water drinking state, wherein the water not only enters the basic drinking portion to serve the pets, but is also driven by the submerged motor coupled to the basic drinking portion to move upward and get introduced into the diverting portion so that the water from the water-holding unit circulates through the drinking unit continuously.

The second objective of the present invention is to provide a hang-on natural water drinking system, characterized in that: the basic drinking portion is supported from below by the supporting portion, a concave portion is concavely disposed at an end of the supporting portion, the guide trough of the basic drinking portion passes through the concave portion of the supporting portion to protrude therefrom, an opening is penetratingly disposed at the bottom of the supporting portion and positioned proximate to the concave portion, a restricting portion extends downward from the basic drinking portion and is positioned proximate to the guide trough so that the restricting portion fits in the opening, the supporting portion has a connecting rod segment which protrudes from the supporting portion and is positioned proximate to the concave portion, the connecting rod segment penetrates a fixture to mount the hang-on drinking system on the fixture and operates in conjunction with a knob to effectuate directional limitation so that the basic drinking portion is steadily supported by the supporting portion.

The third objective of the present invention is to provide a hang-on natural water drinking system, characterized in that: a first rib and a second rib are disposed at the basic drinking portion, spaced apart, and firmly received in openings disposed at the bottom of the diverting portion, respectively, and a third rib is disposed at the basic drinking portion and spaced apart from the second rib so that a receiving space is formed between the second rib and the third rib to receive a filtering component, allowing the filtering component to remove impurities from the water before the water goes from the basic drinking portion to the diverting portion.

The fourth objective of the present invention is to provide a hang-on natural water drinking system, characterized in that: at least two receiving portions, spaced apart, are protrudingly disposed at the bottom of the diverting portion partially received in the basic drinking portion to steadily receive an upper end of the filtering component disposed at the basic drinking portion, so as to effectuate assembly.

The fifth objective of the present invention is to provide a hang-on natural water drinking system, characterized in that: a connecting pipe segment extends upward and downward from a point of the diverting portion, and the point of the diverting portion is where the incoming water exits an end of the submerged motor, a draining element is coupled to the connecting pipe segment from above so that an aperture disposed at the lower end of the draining element is steadily placed in a predetermined concave region of the diverting portion while the connecting pipe segment is moving in, a draining hole horizontally extends from an end of the draining element, draining holes are disposed at the lower end of the draining element, the water discharged from the horizontal draining hole and the draining holes is available for turbulent white-water drinking while crossing the at least one blocking region defined at the diverting portion.

The sixth objective of the present invention is to provide a hang-on natural water drinking system, characterized in that: since the guide trough extending from an end of the basic drinking portion corresponds in position to the connecting segment extending downward from the water-holding unit, on its way to the basic drinking portion, the water from the water-holding unit stops at the outlet of the connecting segment, and the water starts to enter the basic drinking portion again as soon as the water level at the basic drinking portion is lower than the outlet of the connecting segment.

The seventh objective of the present invention is to provide a hang-on natural water drinking system, characterized in that: concave portions are concavely disposed at the guide trough of the basic drinking portion as well as concavely disposed at the supporting portion and corresponding in position to the guide trough, respectively, so that a cable extending from the submerged motor coupled to the basic drinking portion can pass through the basic drinking portion and the supporting portion.

The eighth objective of the present invention is to provide a hang-on natural water drinking system, characterized in that: the basic drinking portion supported from below by the supporting portion and the supporting portion are integrally formed.

The ninth objective of the present invention is to provide a hang-on natural water drinking system, characterized in that: a connecting rod segment extends laterally from the holder for holding the water-holding unit, and the connecting rod segment penetrates the fixture to mount the hang-on drinking system on the fixture and operates in conjunction with a knob to effectuate directional limitation, thereby allowing the water-holding unit to be firmly supported by the holder.

DETAILED DESCRIPTION OF THE EMBODIMENT OF THE INVENTION

Figure 1:
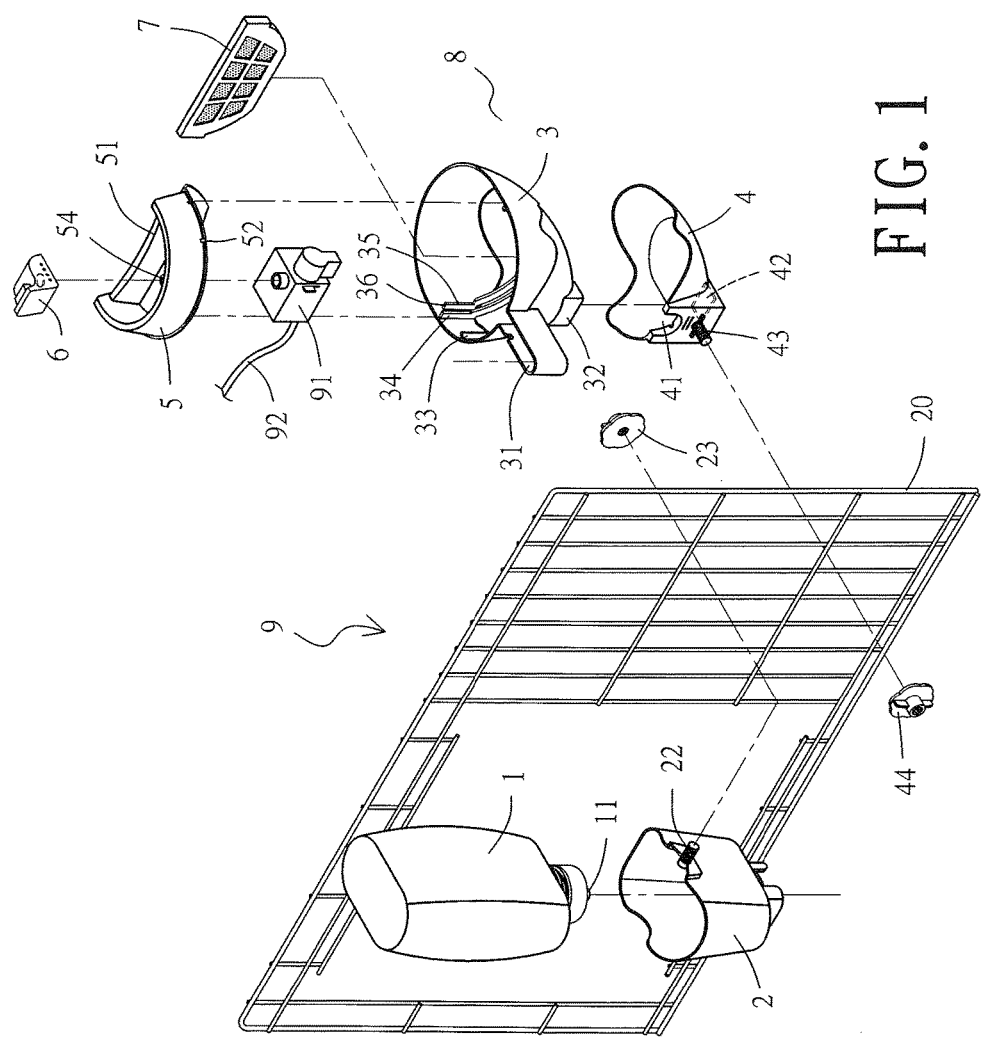
FIG. 1 is an exploded view of a hang-on natural water drinking system of the present invention.
Figure 7:
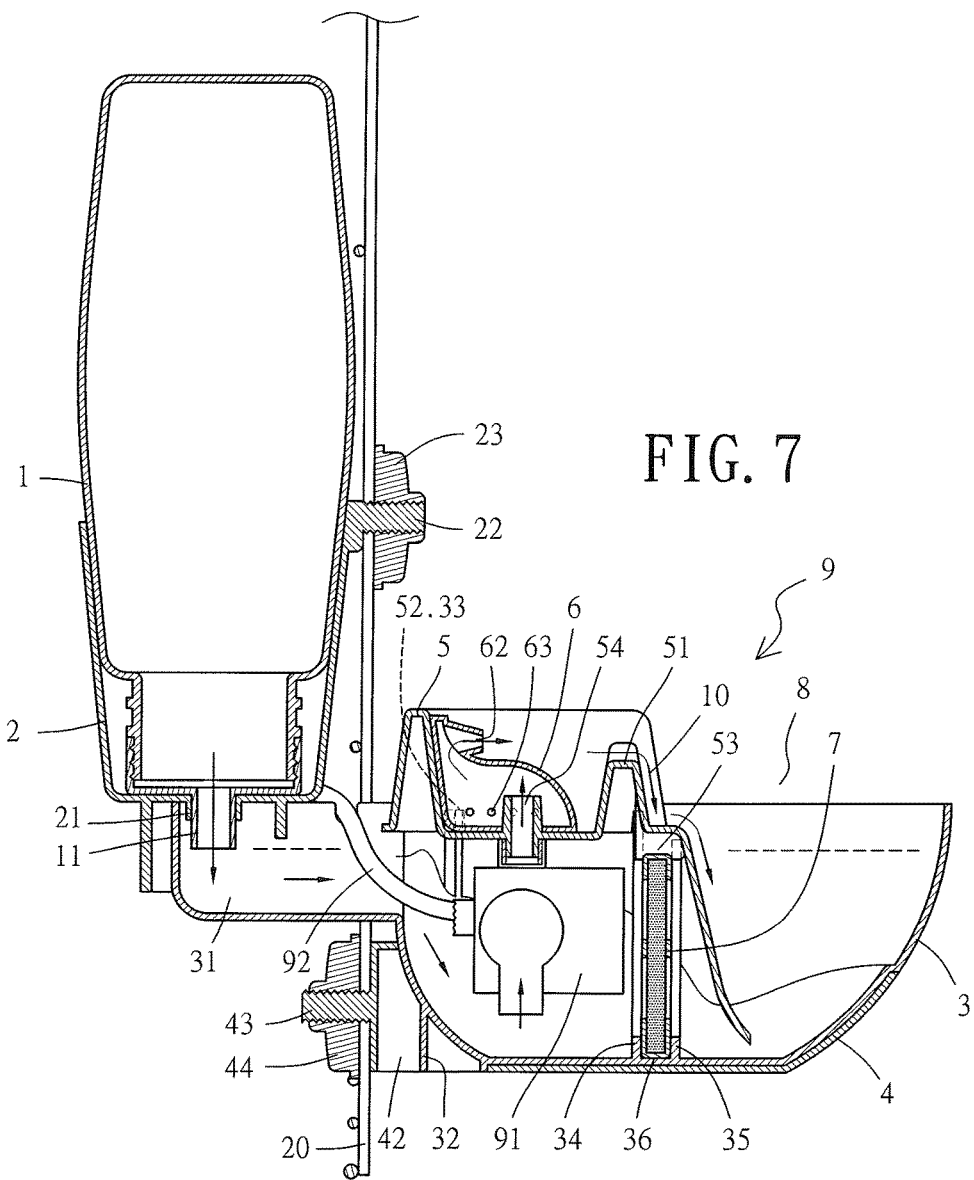
FIG. 7 is a cross-sectional view of the hang-on natural water drinking system which effectuates water circulation according to the present invention.

Referring to FIG. 1 and FIG. 7, a hang-on natural water drinking system of the present invention is provided in the form of a hang-on drinking system 9 adapted to effectuate a natural water state. The hang-on drinking system 9 comprises a water-holding unit 1, a holder 2, and a drinking unit 8. The drinking unit 8 serves pets and comprises a basic drinking portion 3, a supporting portion 4, and a diverting portion 5. The water-holding unit 1 holds drinking water and is laterally provided with a connecting segment 11 for drawing water off the water-holding unit 1. A pipe segment 21 of the holder 2 fits around the connecting segment 11. One end of the basic drinking portion 3 extends to form a guide trough 31. The guide trough 31 abuts against the connecting segment 11 from below to guide water to the basic drinking portion 3. The basic drinking portion 3 is coupled to the diverting portion 5. Water 10 goes from one end of a submerged motor 91 to the diverting portion 5. The water 10 in the diverting portion 5 flows across at least one blocking region 51 defined at the diverting portion 5 in a manner to enter a turbulent white-water drinking state. Then, the water 10 not only enters the basic drinking portion 3 to serve the pets, but is also driven by the submerged motor 91 coupled to the basic drinking portion 3 to move upward and get introduced into the diverting portion 5. Hence, the water 10 from the water-holding unit 1 circulates through the drinking unit 8 continuously.

Figure 2:
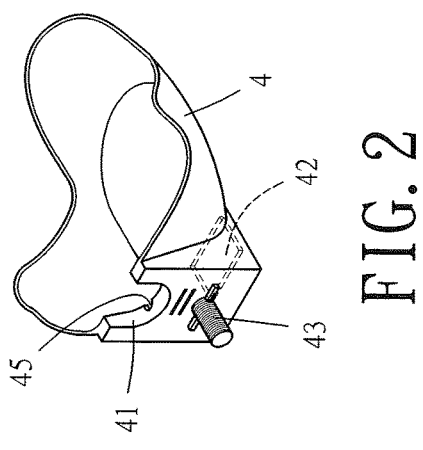
FIG. 2 is a schematic view of related components shown in FIG. 1.
Figure 6:
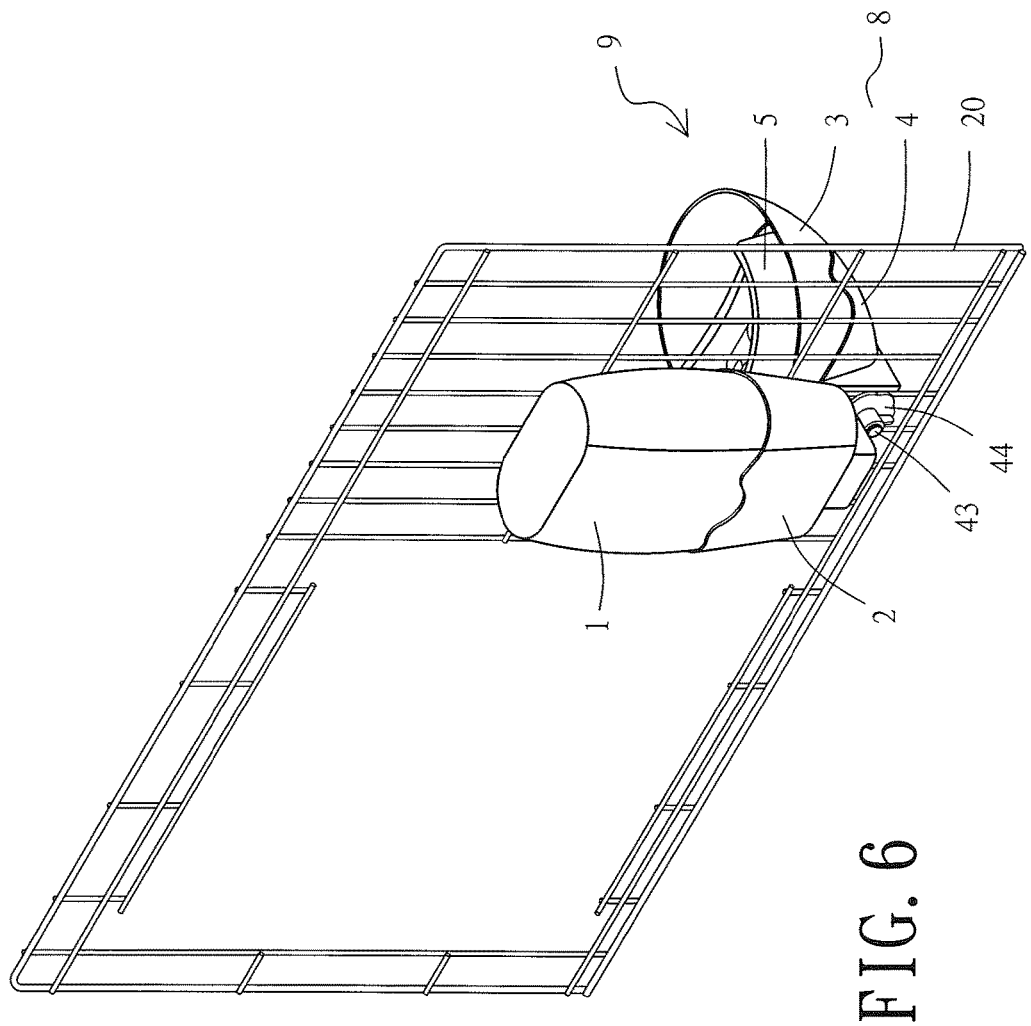
FIG. 6 is a schematic view of the hang-on natural water drinking system mounted on a fixture according to the present invention.

The basic drinking portion 3 is supported from below by the supporting portion 4 (shown in FIG. 1, FIG. 7). A concave portion 41 is concavely disposed at one end of the supporting portion 4. The guide trough 31 of the basic drinking portion 3 passes through the concave portion 41 of the supporting portion 4 to protrude therefrom. An opening 42 (shown in FIG. 2) is penetratingly disposed at the bottom of the supporting portion 4 and positioned proximate to the concave portion 41. A restricting portion 32 extends downward from the basic drinking portion 3 and is positioned proximate to the guide trough 31 so that the restricting portion 32 fits in the opening 42. The supporting portion 4 has a connecting rod segment 43 which protrudes from the supporting portion 4 and is positioned proximate to the concave portion 41. The connecting rod segment 43 penetrates a fixture 20 to mount the hang-on drinking system 9 on the fixture 20 and operates in conjunction with a knob 44 to effectuate directional limitation (as shown in FIG. 6) so that the basic drinking portion 3 is steadily supported by the supporting portion 4.

Figure 3:
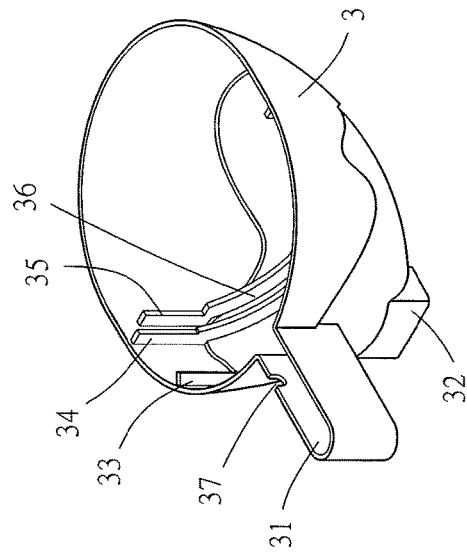
FIG. 3 is a schematic view of related components shown in FIG. 1.
Figure 4:
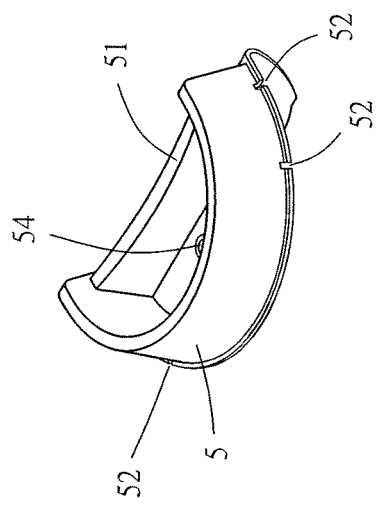
FIG. 4 is a schematic view of related components shown in FIG. 1.

A first rib 33 and a second rib 34 (shown in FIG. 1, FIG. 3) are disposed at the basic drinking portion 3, spaced apart, and firmly received in openings 52 (shown in FIG. 4) disposed at the bottom of the diverting portion 5, respectively. A third rib 35 is disposed at the basic drinking portion 3 and spaced apart from the second rib 34 so that a receiving space 36 is formed between the second rib 34 and the third rib 35 to receive a filtering component 7 (shown in FIG. 7). The filtering component 7 removes impurities from the water 10 before the water 10 goes from the basic drinking portion 3 to the diverting portion 5. At least two receiving portions 53 (shown in FIG. 7), spaced apart, are protrudingly disposed at the bottom of the diverting portion 5 partially received in the basic drinking portion 3 to steadily receive the upper end of the filtering component 7 disposed at the basic drinking portion 3 for the sake of assembly.

Figure 5:
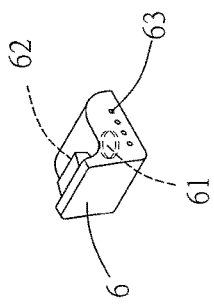
FIG. 5 is a schematic view of related components shown in FIG. 1.

A connecting pipe segment 54 (shown in FIG. 4, FIG. 7) extends upward and downward from a point of the diverting portion 5, and the point of the diverting portion 5 is where the incoming water 10 exits one end of the submerged motor 91. A draining element 6 is coupled to the connecting pipe segment 54 from above so that an aperture 61 (shown in FIG. 5) disposed at the lower end of the draining element 6 is steadily placed in a predetermined concave region of the diverting portion 5 while the connecting pipe segment 54 is moving in. A draining hole 62 horizontally extends from one end of the draining element 6. Draining holes 63 are disposed at the lower end of the draining element 6. The water 10 discharged from the horizontal draining hole 62 and the draining holes 63 is available for turbulent white-water drinking while crossing the at least one blocking region 51 defined at the diverting portion 5.

Since the guide trough 31 extending from one end of the basic drinking portion 3 corresponds in position to the connecting segment 11 extending downward from the water-holding unit 1, on its way to the basic drinking portion 3, the water 10 from the water-holding unit 1 stops at the outlet (indicated by the height of the dashed line shown in FIG. 7) of the connecting segment 11. The water 10 starts to enter the basic drinking portion 3 again as soon as the water level at the basic drinking portion 3 is lower than the outlet of the connecting segment 11.

The concave portions 37, 45 (shown in FIG. 3, FIG. 2) are concavely disposed at the guide trough 31 of the basic drinking portion 3 as well as concavely disposed at the supporting portion 4 and corresponding in position to the guide trough 31, respectively, so that a cable 92 extending from the submerged motor 91 coupled to the basic drinking portion 3 can pass through the basic drinking portion 3 and the supporting portion 4 (as shown in FIG. 7). The basic drinking portion 3 supported from below by the supporting portion 4 and the supporting portion 4 are integrally formed as needed (to allow the connecting rod segment 43 extending outward from one end of the basic drinking portion 3 to penetrate the fixture 20 and operate in conjunction with the knob 44 to effectuate directional limitation). A connecting rod segment 22 (shown in FIG. 1) extends laterally from the holder 2 for holding the water-holding unit 1. The connecting rod segment 22 penetrates the fixture 20 to mount the hang-on drinking system 9 on the fixture 20 and operates in conjunction with a knob 23 to effectuate directional limitation, thereby allowing the water-holding unit 1 to be firmly supported by the holder 2.

The draining holes 63 disposed at the lower end of the draining element 6 coupled to a predetermined concave region of the diverting portion 5 are normally adapted to regulate water pressure. However, if the drinking system 9 is not configured to operate around the clock, impurities and foreign bodies (such as cat hairs) will be removed from the water 10 through the draining holes 63.

What is claimed is:

1. A hang-on natural water drinking system, provided in form of a hang-on drinking system adapted to effectuate a natural water state, the hang-on drinking system comprising:
    a holder having a pipe segment;
    a water-holding unit for holding drinking water and laterally provided with a connecting segment for drawing water off the water-holding unit, allowing the pipe segment to fit around the connecting segment; and
    a drinking unit serving pets and comprising a basic drinking portion, a supporting portion, and a diverting portion, the basic drinking portion having an end extending to form a guide trough, the guide trough abutting against the connecting segment from below to guide water to the basic drinking portion, allowing water to go from an end of a submerged motor to the diverting portion coupled to the basic drinking portion, allowing the water in the diverting portion to flow across at least one blocking region defined at the diverting portion in a manner to enter a turbulent white-water drinking state, wherein the water not only enters the basic drinking portion to serve the pets, but is also driven by the submerged motor coupled to the basic drinking portion to move upward and get introduced into the diverting portion so that the water from the water-holding unit circulates through the drinking unit continuously.

2. The hang-on natural water drinking system of claim 1, wherein the basic drinking portion is supported from below by the supporting portion, a concave portion is concavely disposed at an end of the supporting portion, the guide trough of the basic drinking portion passes through the concave portion of the supporting portion to protrude therefrom, an opening is penetratingly disposed at the bottom of the supporting portion and positioned proximate to the concave portion, a restricting portion extends downward from the basic drinking portion and is positioned proximate to the guide trough so that the restricting portion fits in the opening, the supporting portion has a connecting rod segment which protrudes from the supporting portion and is positioned proximate to the concave portion, the connecting rod segment penetrates a fixture to mount the hang-on drinking system on the fixture and operates in conjunction with a knob to effectuate directional limitation so that the basic drinking portion is steadily supported by the supporting portion.

3. The hang-on natural water drinking system of claim 2, wherein concave portions are concavely disposed at the guide trough of the basic drinking portion as well as concavely disposed at the supporting portion and corresponding in position to the guide trough, respectively, so that a cable extending from the submerged motor coupled to the basic drinking portion can pass through the basic drinking portion and the supporting portion.

4. The hang-on natural water drinking system of claim 1, wherein a first rib and a second rib are disposed at the basic drinking portion, spaced apart, and firmly received in openings disposed at the bottom of the diverting portion, respectively, and a third rib is disposed at the basic drinking portion and spaced apart from the second rib so that a receiving space is formed between the second rib and the third rib to receive a filtering component, allowing the filtering component to remove impurities from the water before the water goes from the basic drinking portion to the diverting portion.

5. The hang-on natural water drinking system of claim 4, wherein at least two receiving portions, spaced apart, are protrudingly disposed at the bottom of the diverting portion partially received in the basic drinking portion to steadily receive an upper end of the filtering component disposed at the basic drinking portion, so as to effectuate assembly.

6. The hang-on natural water drinking system of claim 1, wherein a connecting pipe segment extends upward and downward from a point of the diverting portion, and the point of the diverting portion is where the incoming water exits an end of the submerged motor, a draining element is coupled to the connecting pipe segment from above so that an aperture disposed at the lower end of the draining element is steadily placed in a predetermined concave region of the diverting portion while the connecting pipe segment is moving in, a draining hole horizontally extends from an end of the draining element, draining holes are disposed at the lower end of the draining element, the water discharged from the horizontal draining hole and the draining holes is available for turbulent white-water drinking while crossing the at least one blocking region defined at the diverting portion.

7. The hang-on natural water drinking system of claim 1, wherein since the guide trough extending from an end of the basic drinking portion corresponds in position to the connecting segment extending downward from the water-holding unit, on its way to the basic drinking portion, the water from the water-holding unit stops at the outlet of the connecting segment, and the water starts to enter the basic drinking portion again as soon as the water level at the basic drinking portion is lower than the outlet of the connecting segment.

8. The hang-on natural water drinking system of claim 1, wherein the basic drinking portion supported from below by the supporting portion and the supporting portion are integrally formed.

9. The hang-on natural water drinking system of claim 1, wherein a connecting rod segment extends laterally from the holder for holding the water-holding unit, and the connecting rod segment penetrates the fixture to mount the hang-on drinking system on the fixture and operates in conjunction with a knob to effectuate directional limitation, thereby allowing the water-holding unit to be firmly supported by the holder.

\* \* \* \* \*